US010717467B2

(12) United States Patent
Brandon

(10) Patent No.: US 10,717,467 B2
(45) Date of Patent: *Jul. 21, 2020

(54) CONTINUOUSLY VARIABLE TRANSMISSION SYSTEM

(71) Applicant: Dennis Brandon, Brentwood, TN (US)

(72) Inventor: Dennis Brandon, Brentwood, TN (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/895,166

(22) Filed: Feb. 13, 2018

(65) Prior Publication Data

US 2018/0304925 A1 Oct. 25, 2018

Related U.S. Application Data

(63) Continuation of application No. 15/076,758, filed on Mar. 22, 2016, now Pat. No. 9,889,883, which is a continuation of application No. 13/903,640, filed on May 28, 2013, now Pat. No. 9,291,246.

(60) Provisional application No. 61/652,313, filed on May 28, 2012.

(51) Int. Cl.
  *B62D 11/10* (2006.01)
  *F16H 9/16* (2006.01)
  *F16H 9/12* (2006.01)
  *F16H 9/04* (2006.01)

(52) U.S. Cl.
  CPC ............ *B62D 11/105* (2013.01); *F16H 9/04* (2013.01); *F16H 9/12* (2013.01); *F16H 9/16* (2013.01); *F16H 2009/163* (2013.01); *F16H 2009/166* (2013.01)

(58) Field of Classification Search
  CPC ........ F16H 9/04; F16H 9/16; F16H 2009/163; F16H 2009/166; B62D 9/00; B62D 11/10; B62D 11/105; B60W 10/10; B60W 10/20; B60W 30/045
  USPC .................................................. 474/8–29, 69
  See application file for complete search history.

(56) References Cited

U.S. PATENT DOCUMENTS

| 4,063,609 | A | * | 12/1977 | Kincaid | B60K 17/16 180/246 |
| 5,527,225 | A | * | 6/1996 | Dick | B60K 17/342 180/251 |
| 5,766,105 | A | * | 6/1998 | Fellows | F16H 61/6625 474/18 |
| 7,401,870 | B2 | * | 7/2008 | Tseng | B60G 17/0162 180/6.2 |
| 7,992,659 | B2 | * | 8/2011 | Schaedler | B62D 7/08 180/6.24 |

(Continued)

*Primary Examiner* — Michael R Mansen
*Assistant Examiner* — Robert T Reese
(74) *Attorney, Agent, or Firm* — Wayne Edward Ramage; Baker Donelson

(57) ABSTRACT

A continuously variable transmission (CVT) system, which turns the rear wheels of a lawn mower or similar vehicle at different speeds in a coordinated method with the front steering wheels in order to achieve the best turning radius (including a tight or zero turn radius, if desired) under most conditions. The system comprises two stages: the first stage comprising a Fixed Center Distance CVT pulley system, and the second stage comprising dual CVTs (e.g., left and right) that input into dual gear reducers (left and right), which are mechanically connected to the rear wheels. The second stage dual CVTs (left and right) are synchronized with the steering wheel, thus achieving different rear wheel speeds and/or directions based on the steering wheel position.

10 Claims, 6 Drawing Sheets

(56) References Cited

U.S. PATENT DOCUMENTS

| | | | |
|---|---|---|---|
| 9,291,246 B2* | 3/2016 | Brandon | F16H 9/04 |
| 9,889,883 B2* | 2/2018 | Brandon | F16H 9/04 |
| 2015/0032335 A1* | 1/2015 | Kodama | B60W 10/20 |
| | | | 701/42 |

* cited by examiner

CONTINUOUSLY VARIABLE TRANSMISSION SYSTEM

This application is a continuation of U.S. application Ser. No. 15/076,758, filed Mar. 22, 2016, which is a continuation of U.S. application Ser. No. 13/903,640, filed May 28, 2013, by Dennis Brandon, which claims benefit of and priority to U.S. Provisional Application No. 61/652,313, filed May 28, 2012, by Dennis Brandon, and is entitled to those filing dates for priority. The specifications, figures and complete disclosures of U.S. Provisional Application No. 61/652,313 and U.S. application Ser. Nos. 15/076,758 and 13/903,640 are incorporated herein by specific reference for all purposes.

FIELD OF INVENTION

This invention relates to a continuously variable transmission system for use with riding lawnmowers and other vehicles to achieve a small turning radius or zero turn radius.

BACKGROUND OF THE INVENTION

A tight turning radius is very important for riding lawnmowers to mow grass around objects such as trees. Zero turn mowers are very good for mowing around objects since their turning radius is very small. However, the cost of a zero turn mower is very high compared to typical riding lawnmowers, and the driving of a zero turn mower using two levers is perceived to be difficult for many consumers. Further, the hydrostatic transmissions are very inefficient. Most zero turn mowers have the engine in the rear of the mower and caster wheels in the front. An example of a zero-radius turn mower is disclosed in Schaedler, et al., U.S. Pat. No. 7,992,659, which is incorporated herein by specific reference for all purposes.

A standard riding mower with the engine in the front that uses a steering wheel to turn the front wheel has a limited turning radius. Further, the tightest turning radius is only achievable at a moderate speeds and on ideal surfaces. Under most conditions, the mower tries to push forward and slide the front tires rather than turn in accordance with the actual turning direction of the front tires. Attempts have been made to use a zero turn type transmission with caster wheels on a standard mower; however, on side hills or slopes the front end of the mower tends to drift downhill due to the weight of the engine in the front of the mower, thereby making it difficult to drive in a straight line forward.

To achieve the best cutting performance, most manufacturers recommend cutting grass with the engine at its maximum RPM. This requires a transmission that can vary the ground speed of the mower while the engine RPM is constant. Most prefer a ground speed range of 1 to 6 miles per hour and the mower must be capable of a reverse motion and speed control as well.

The typical riding mower has a steering wheel that is mechanically connected to steering rods or linkages that turn the front wheels and has a foot pedal that controls the ground speed and direction via a hydrostatic type transmission. However, some mowers use a geared transmission that requires the user to shift gears for speed and direction.

SUMMARY OF INVENTION

In various exemplary embodiments, the present invention comprises a continuously variable transmission (CVT) system, which turns the rear wheels of a lawn mower or similar vehicle at different speeds in a coordinated method with the front steering wheels in order to achieve the best turning radius (including a tight or zero turn radius, if desired) under most conditions. The system of the present invention is more cost effective and efficient than the zero turn methods and systems known in the prior art.

There are several varieties of CVT type systems, such as pulley based, toroidal, friction drive, and hydrostatic systems. These are used in many types of applications, including but not limited to automobiles, motorcycles, lawnmowers, go karts, as well as industrial uses for machinery and equipment.

In one embodiment, a riding lawnmower uses a pulley-based CVT system. The system includes two stages: the first stage controlling the primary ground speed, and the second stage having dual CVTs (e.g., left and right) that input into dual gear reducers (left and right). The rear wheels are mechanically connected to the output of the reducers (left and right). The reducers also include a shifting mechanism for forward and reverse. The second stage dual CVTs (left and right) are synchronized with the steering wheel, thus achieving different rear wheel speeds and/or directions based on the steering wheel position.

There are two types of pulley-based systems: Fixed Center Distance (FCD), and Adjustable Center Distance (ACD). In a FCD system, two pulleys are in a fixed position relative to each other. The first pulley is manually adjusted so that the two sheave halves move in and out changing the pitch diameter of the belt around the first pulley. The second pulley is spring loaded allowing the two sheave halves to move in and out and when the diameter of the first pulley changes the spring pressure of the second pulley, it forces the pitch diameter of the second pulley to change in accordance with the first. The FCD method changes the pitch diameter of the first and second pulley and achieves the maximum speed ratio. The RPM of the first pulley does not change, but the pitch diameter of the first pulley affects the feet per minute that the belt travels per revolution. The RPM and pitch diameter of the second pulley both change as a result of the feet per minute of the belt and the pitch diameter of the first pulley. The change in feet per minute and/or the RPM change are equivalent to a speed change.

In an ACD system, the center distance between the two pulleys changes. One pulley is similar to an idler pulley in that the pitch diameter does not change. The idler pulley moves toward or away from the second pulley. The second pulley is spring loaded allowing the two sheave halves to move in and out which changes the pitch diameter. When the idler pulley moves away from the second pulley the belt is pulled toward the center of the second pulley which makes the pitch diameter smaller thus reducing the feet per minute. Conversely, when the idler pulley moves toward the second pulley, the spring pressure of the second pulley moves the belt to the outside of the pulley making the pitch larger and increasing the feet per minute. In this type of system, the pitch diameter of only one pulley changes, therefore, typically it only achieves half of the ratio change possible with a FCD system.

In one embodiment, the system comprises a CVT transmission that uses a FCD pulley system for both the first and second stages. The first stage pulleys are "A" and "B/C" (a double pulley with "B" being a variable speed pulley and "C" being a fixed pulley). Pulley "D" is an intermediate pulley. The second stage pulleys are "E", "F", "G" and "H". A belt goes from pulley "A" (which is mounted on the engine shaft) to pulley "B" of "B/C" ("B" being the variable speed pulley). Either pulley "A" or "B" in the first stage is mechanically connected to the foot pedal on the vehicle, which adjusts the pitch diameters of the first stage pulleys and thus the primary ground speed. Pulley "C" is connected by a second belt to pulley "D". Pulley "D" is on a shaft that drives pulleys "E" and "F". Pulley "E" is connected by a belt to pulley "G", and pulley "F" is connected to pulley "H". Pulley "E" or "G" is connected by a linkage to the left side of the steering plate, and "F" or "H" is connected by a linkage to the right side of the steering plate. When the steering plate rotates with the steering wheel, the linkages pull or push in opposite directions a lever on each pulley which manually adjusts the pitch diameters of the pulleys. This causes one wheel to speed up and one wheel to slow down in a coordinated method with the front steered wheels.

In another embodiment, the system comprises a CVT transmission that utilizes a FCD pulley system in the first stage and an ACD pulley system in the second stage. The first stage pulleys are labeled "A" and "B". The second stage pulleys are labeled "C/E", "D/F", "G" and "H". A belt goes from pulley "A" (which is connected to the vehicle engine) around the "C" and "D" pulleys, and then to pulley "B". The speed of "C" and "D" pulleys of the second stage is based on the pitch diameters of the first stage pulleys "A" and "B". One of the pulleys "A' or "B" in the first stage is mechanically connected to the foot pedal which adjusts the pitch diameters and thus the primary speed. Pulleys "C/E" and "D/F" are double idler pulleys which rotate together and are mounted on a steering plate that rotates with the steering wheel rotation. A belt goes from "E" to "G" and another belt goes from "F" to "H". When the steering plate rotates with the steering wheel it causes the "C/E" and "D/F" pulleys to move toward and away from pulleys "G" and "H" in opposite directions thus changing the pitch diameter of pulleys "G" and "H". This causes one wheel to speed up and one wheel to slow down in a coordinated method with the front steered wheels.

In yet another embodiment, the system comprises a CVT transmission that utilizes a FCD pulley system in the first stage and an ACD pulley system with gears in the second stage. The first stage pulleys are labeled "A" and "B". The second stage pulleys are labeled "C", "D", "E" and "F". A belt goes from pulley "A" (pulley connected to engine) to pulley "B". One of the pulleys "A" or "B" in the first stage is mechanically connected to the foot pedal which adjusts the pitch diameters and thus the primary speed. Pulley "B" is mechanically connected by gears to pulleys "C" and "D" of the second stage and the speed is based on the pitch diameters of the first stage pulleys "A" and "B". Pulleys "C" and "D" are idler pulleys which are mounted on a steering plate that rotates with the steering wheel rotation. A belt goes from "C" to "F" and another belt goes from "D" to "E". When the steering plate rotates with the steering wheel it causes the "C" and "D" pulleys to move toward and away from pulleys "E" and "F" in opposite directions thus changing the pitch diameter of pulleys "E" and "F". This causes one wheel to speed up and one wheel to slow down in a coordinated method with the front steered wheels.

DETAILED DESCRIPTION OF EXEMPLARY EMBODIMENTS

Figure 1:
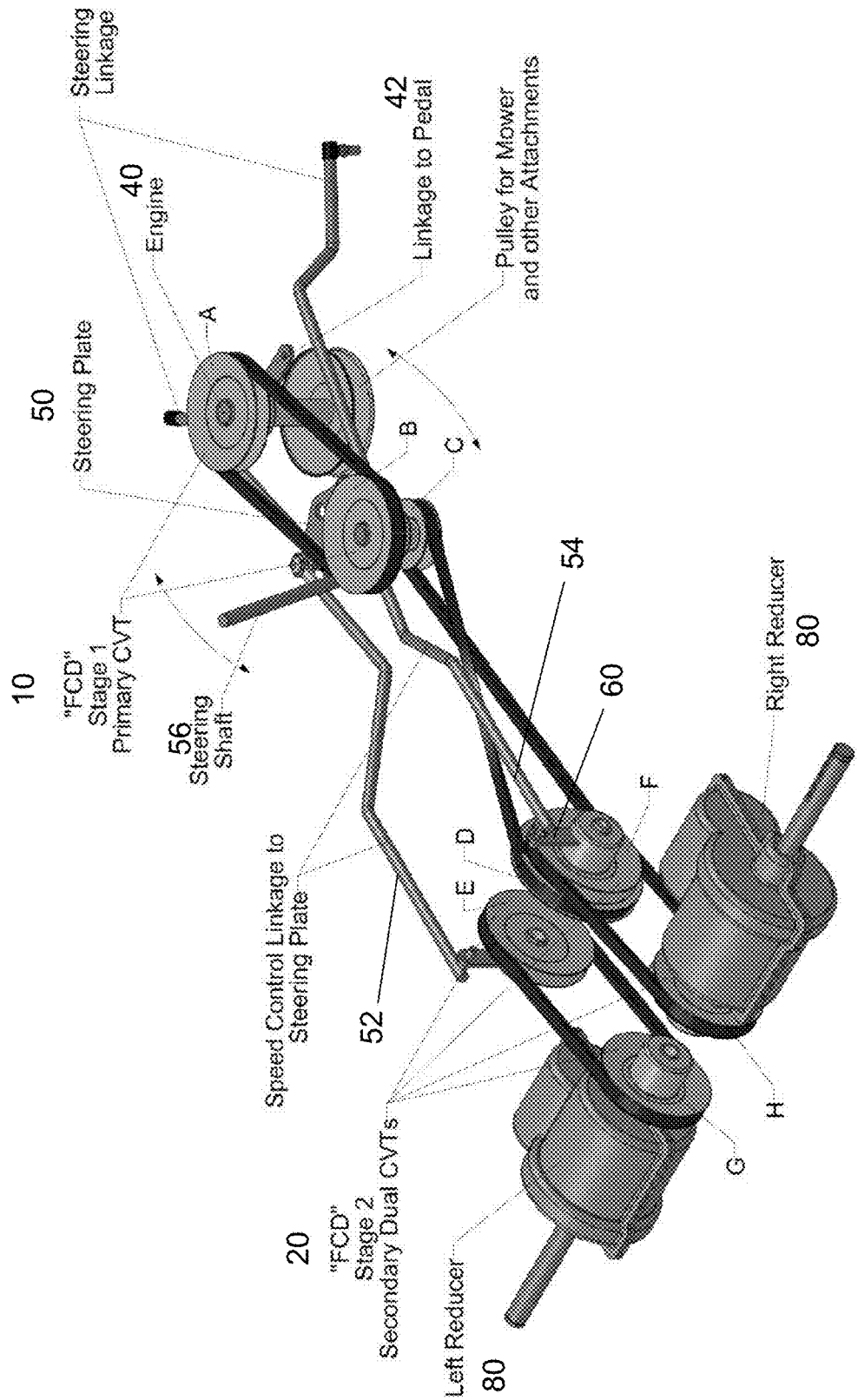
FIG. 1 shows a perspective view of a drive system with a FCD pulley system for both the first and second stages in accordance with an embodiment of the present invention.

In various exemplary embodiments, the present invention comprises a continuously variable transmission (CVT) system, which turns the rear wheels of a lawn mower or similar vehicle at different speeds in a coordinated method with the front steering wheels in order to achieve the best turning radius (including a tight or zero turn radius, if desired) under most conditions. The system of the present invention is more cost effective and efficient than the zero turn methods and systems known in the prior art.

There are several varieties of CVT type systems, such as pulley based, toroidal, friction drive, and hydrostatic systems. These are used in many types of applications, including but not limited to automobiles, motorcycles, lawnmowers, go karts, as well as industrial uses for machinery and equipment.

In one embodiment, a riding lawnmower uses a pulley-based CVT system. The system includes two stages: the first stage 10 controlling the primary ground speed, and the second stage 20 having dual CVTs (e.g., left and right) that input into dual gear reducers 80 (left and right). The rear wheels are mechanically connected to the output of the reducers (left and right). The reducers also include a shifting mechanism for forward and reverse. The second stage dual CVTs (left and right) are synchronized with the steering wheel, thus achieving different rear wheel speeds and/or directions based on the steering wheel position.

There are two types of pulley-based systems: Fixed Center Distance (FCD), and Adjustable Center Distance (ACD). In a FCD system, two pulleys are in a fixed position relative to each other. The first pulley is manually adjusted so that the two sheave halves move in and out changing the pitch diameter of the belt around the first pulley. The second pulley is spring loaded allowing the two sheave halves to move in and out and when the diameter of the first pulley changes the spring pressure of the second pulley, it forces the pitch diameter of the second pulley to change in accordance the first. The FCD method changes the pitch diameter of the first and second pulley and achieves the maximum speed ratio. Note that the RPM of the first pulley does not change, but the pitch diameter of the first pulley affects the feet per minute that the belt travels per revolution. The RPM and pitch diameter of the second pulley both change as a result of the feet per minute of the belt and the pitch diameter of the first pulley. The change in feet per minute and/or the RPM change are equivalent to a speed change.

In an ACD system, the center distance between the two pulleys changes. One pulley is similar to an idler pulley in that the pitch diameter does not change. The idler pulley moves toward or away from the second pulley. The second pulley is spring loaded allowing the two sheave halves to move in and out which changes the pitch diameter. When the idler pulley moves away from the second pulley the belt is pulled toward the center of the second pulley which makes the pitch diameter smaller thus reducing the feet per minute. Conversely, when the idler pulley moves toward the second pulley, the spring pressure of the second pulley moves the belt to the outside of the pulley making the pitch larger and increasing the feet per minute. In this type of system, the pitch diameter of only one pulley changes, therefore, typically it only achieves half of the ratio change possible with a FCD system.

Figure 2:
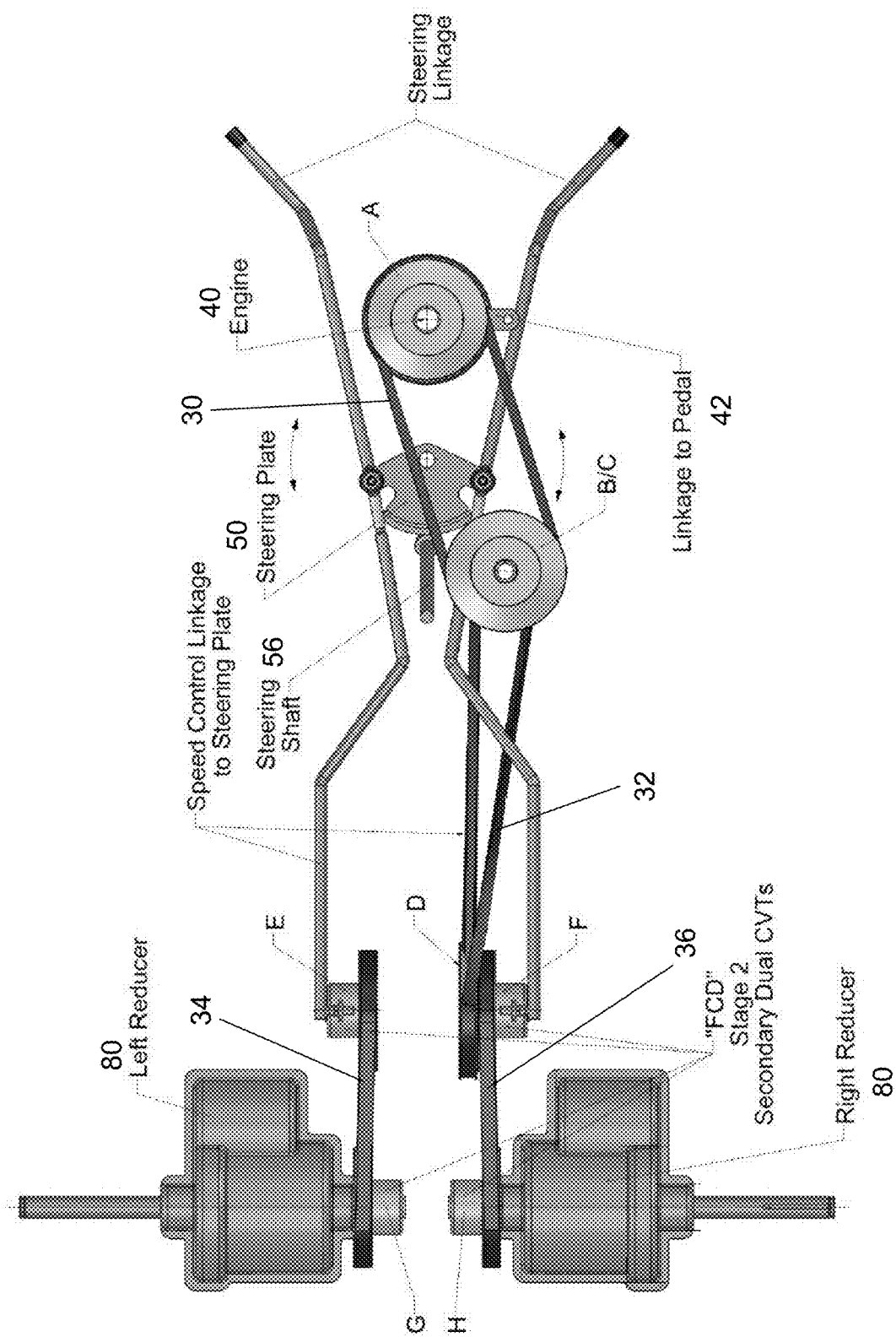
FIG. 2 shows a top view of the drive system of FIG. 1.

FIGS. 1 and 2 show a CVT transmission that uses a FCD pulley system for both the first 10 and second 20 stages. The first stage pulleys 10 are "A" and "B/C". Pulley "D" is an intermediate pulley. The second stage pulleys 20 are "E", "F", "G" and "H". A belt 30 goes from pulley "A" (which is mounted on the engine shaft 40) to pulley "B" of "B/C" (a double pulley with "B" being a variable speed pulley and "C" being a fixed pulley). Either pulley "A" or "B" in the first stage is mechanically connected 42 to the foot pedal on the vehicle, which adjusts the pitch diameters of the first stage pulleys and thus the primary ground speed. Pulley "C" is connected by a second belt 32 to pulley "D". Pulley "D" is on a shaft that drives pulleys "E" and "F". Pulley "E" is connected by a belt 34 to pulley "G", and pulley "F" is connected by a belt 36 to pulley "H". Pulley "E" or "G" is connected by a linkage 52 to the left side of the steering plate 50, and "F" or "H" is connected by a linkage 54 to the right side of the steering plate 50. When the steering plate rotates with the steering wheel (by means of the steering shaft 56), the linkages pull or push in opposite directions a lever 60 on each pulley which manually adjusts the pitch diameters of the pulleys. This causes one wheel to speed up and one wheel to slow down in a coordinated method with the front steered wheels.

Figure 3:
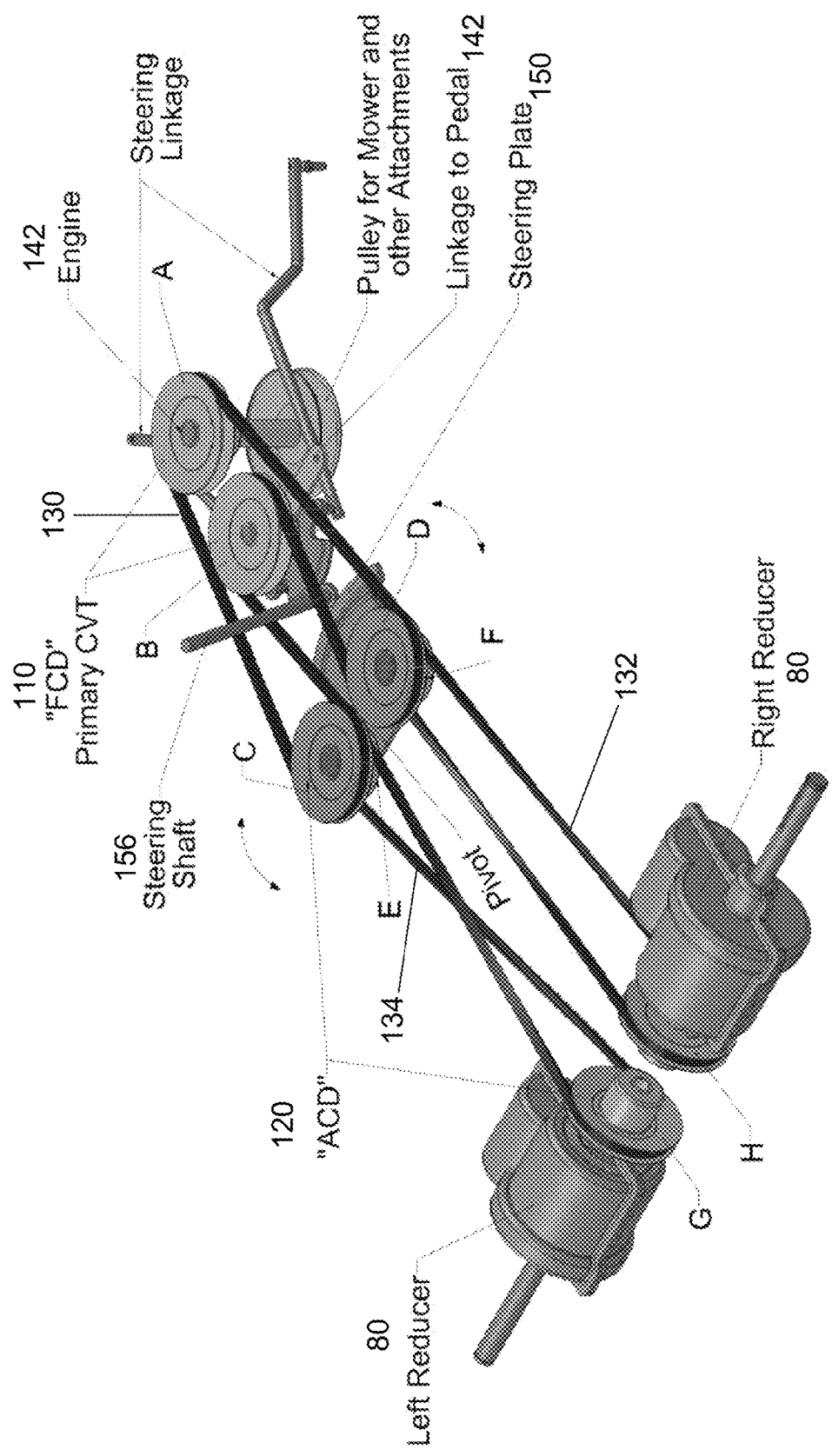
FIG. 3 shows a perspective view of a drive system with a FCD pulley system for the first stage and an ACD pulley system for the second stage, in accordance with another embodiment of the present invention.
Figure 4:
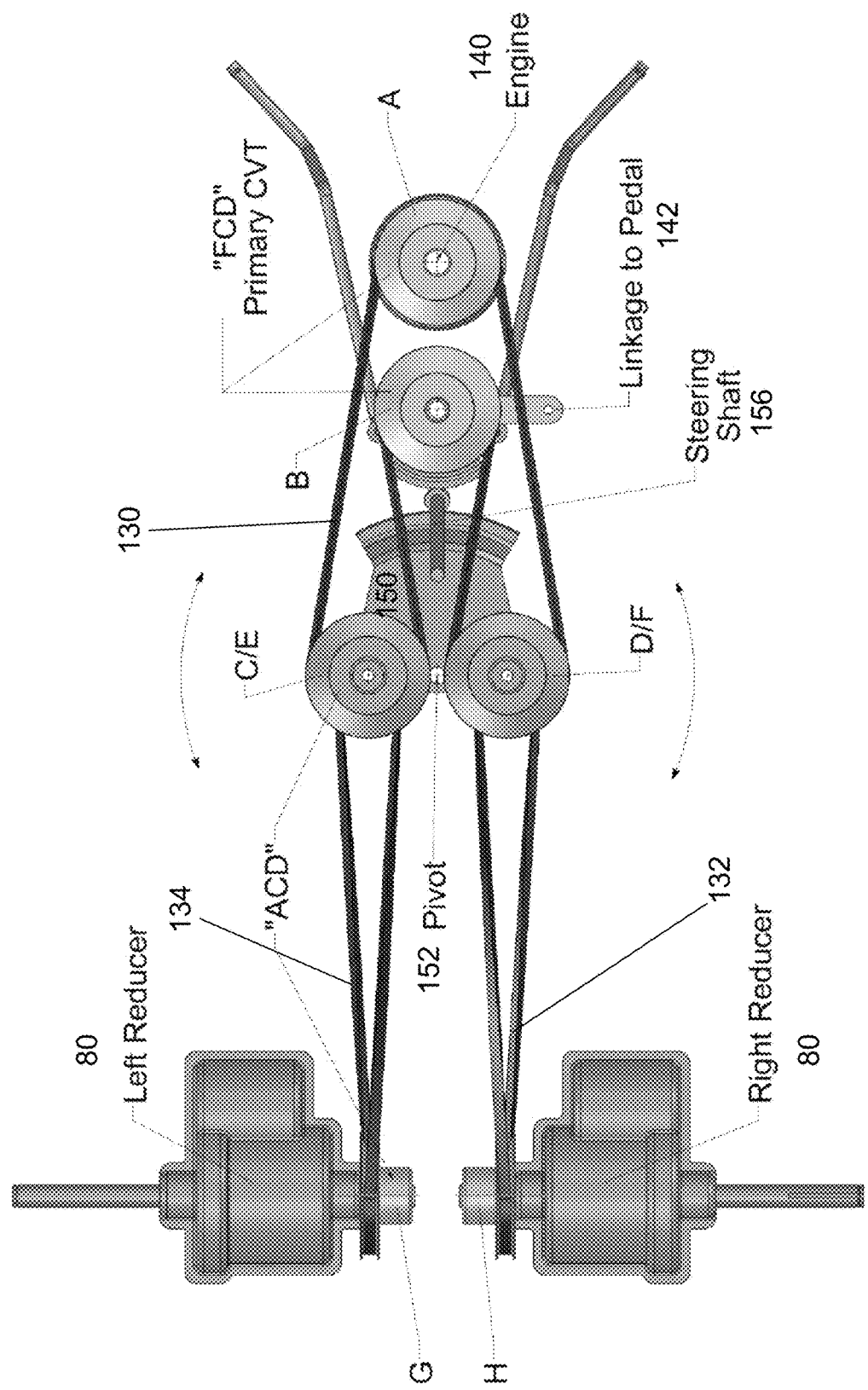
FIG. 4 shows a top view of the drive system of FIG. 3.

FIGS. 3 and 4 show a CVT transmission that utilizes a FCD pulley system in the first stage 110 and an ACD pulley system in the second stage 120. The first stage pulleys 110 are labeled "A" and "B". The second stage pulleys 120 are labeled "C/E", "D/F", "G" and "H". A belt 130 goes from pulley "A" (which is connected to the vehicle engine through the engine shaft 140) around the "C" and "D" pulleys, and then to pulley "B". The speed of "C" and "D" pulleys of the second stage is based on the pitch diameters of the first stage pulleys "A" and "B". One of the pulleys "A" or "B" in the first stage is mechanically connected 142 to the foot pedal which adjusts the pitch diameters and thus the primary speed. Pulleys "C/E" and "D/F" are double idler pulleys which rotate together and are mounted on a steering plate 150 that rotates with the steering wheel rotation (by means of the steering shaft 156). A belt 134 goes from "E" to "G" and another belt 132 goes from "F" to "H". When the steering plate 150 rotates (around a pivot 152) with the steering wheel (via the steering shaft 156) it causes the "C/E" and "D/F" pulleys to move toward and away from pulleys "G" and "H" in opposite directions thus changing the pitch diameter of pulleys "G" and "H". This causes one wheel to speed up and one wheel to slow down in a coordinated method with the front steered wheels.

Figure 5:
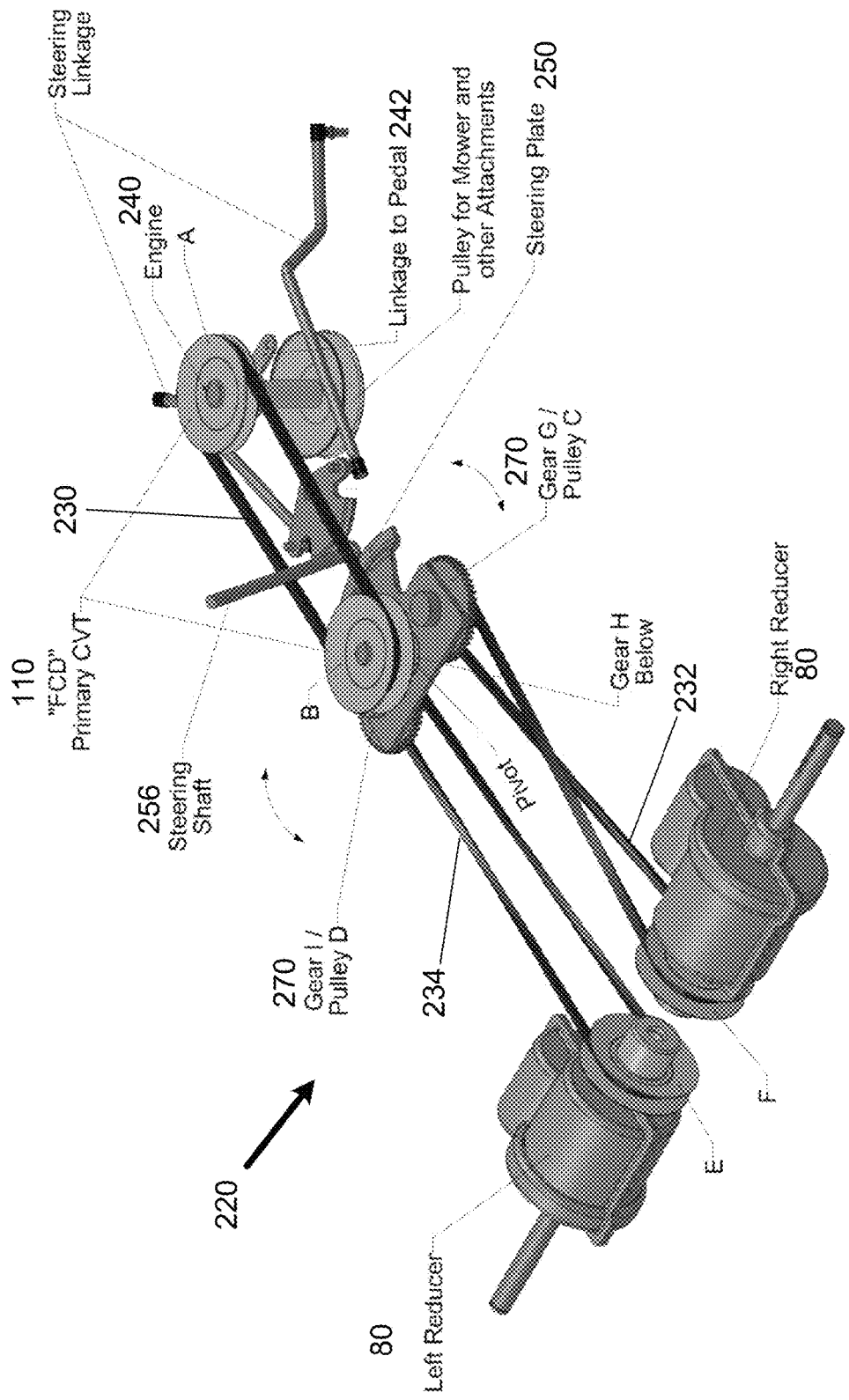
FIG. 5 shows a perspective view of a drive system with a FCD pulley system for the first stage and an ACD pulley system with gears for the second stage, in accordance with another embodiment of the present invention.
Figure 6:
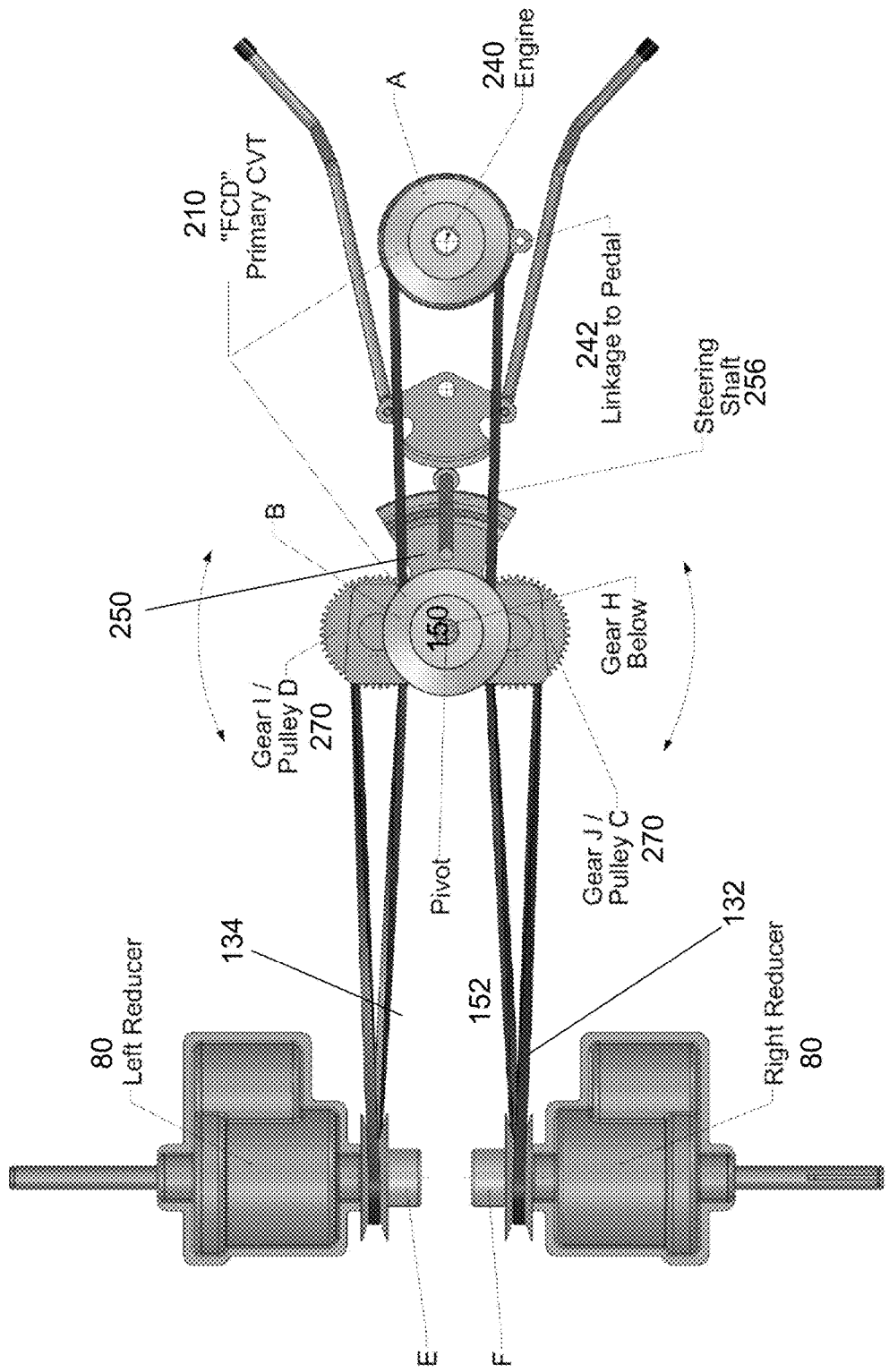
FIG. 6 shows a top view of the drive system of FIG. 5.

FIGS. 5 and 6 show another embodiment of a CVT transmission that utilizes a FCD pulley system in the first stage 210 and an ACD pulley system with gears in the second stage 220. The first stage pulleys are labeled "A" and "B". The second stage pulleys are labeled "C", "D", "E" and "F". A belt 230 goes from pulley "A" (pulley is connected to engine) to pulley "B". One of the pulleys "A" or "B" in the first stage is mechanically connected 242 to the foot pedal which adjusts the pitch diameters and thus the primary speed. Pulley "B" is mechanically connected by gears 270 to pulleys "C" and "D" of the second stage and the speed is based on the pitch diameters of the first stage pulleys "A" and "B". Pulleys "C" and "D" are idler pulleys which are mounted on a steering plate 250 that rotates with the steering wheel rotation. A belt 234 goes from "C" to "F" and another belt 232 goes from "D" to "E". When the steering plate 250 rotates with the steering wheel it causes the "C" and "D" pulleys to move toward and away from pulleys "E" and "F" in opposite directions thus changing the pitch diameter of pulleys "E" and "F". This causes one wheel to speed up and one wheel to slow down in a coordinated method with the front steered wheels.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A continuously variable transmission (CVT) system for a small vehicle with an engine and engine shaft, a steering wheel mechanically connected to a steering plate, and a right and left rear wheel, comprising:
    a primary stage comprising a fixed center distance (FCD) pulley system with at least two pulleys, a first primary stage pulley and a second primary stage pulley, wherein the first primary stage pulley is mechanically connected to the engine or engine shaft, and the first and second stage pulleys are connected by a first belt; and
    a secondary stage mechanically connected to said primary stage, said secondary stage comprising an adjustable center distance (ACD) pulley system with at least two gears, and with at least four pulleys arranged in right and left pairs, each pair comprising a front and back pulley connected by a right or left second belt, wherein the front pulley of each pair is connected to a corresponding gear, and further wherein the back pulley of each pair is mechanically connected to the right or left rear wheels of the vehicle, respectively;
    wherein the pitch diameters of some or all of the pulleys in the secondary stage are changed in response to rotation of the steering plate, causing one of the rear wheels to speed up and the other rear wheel to slow down in a coordinated manner.

2. The system of claim 1, wherein either said first or second primary stage pulley is mechanically connected to a speed control pedal on the vehicle.

3. The system of claim 1, wherein the back pulley of each pair of pulleys in the secondary stage is mechanically connected to a reducer, which is mechanically connected to the respective rear wheel.

4. The system of claim 1, wherein the front pulleys of the secondary stage are dual idler pulleys mounted on the steering plate, each with a first idler pulley part and a second idler pulley part, and the first belt extends from the first primary stage pulley to the first part of the right front secondary stage idler pulley to the second primary stage pulley to the first part of the left front secondary stage idler pulley.

5. The system of claim 4, wherein the second idler pulley part of each of the front pulleys of the secondary stage is connected by the right or left second belt to the respective back pulleys.

6. The system of claim 5, wherein rotation of the steering plate causes the right and left dual idler pulleys to move toward and away from their respective back pulleys in opposite directions, thereby changing the pitch diameter of the pulley.

7. The system of claim 1, wherein the front pulleys of the secondary stage are idler pulleys mounted on the steering plate, and are further connected by individual gears to the second primary stage pulley.

8. The system of claim 7, wherein rotation of the steering plate causes the respective right and left idler pulleys to move toward and away from their respective back pulleys in opposite directions, thereby changing the pitch diameter of the pulley.

9. The system of claim 1, further wherein the second primary stage pulley is mechanically connected to said at least two gears in the secondary stage.

10. The system of claim 1, further comprising a third gear mechanically connecting the second primary stage pulley to said at least two gears in the secondary stage.

\* \* \* \* \*